US009532272B2

(12) United States Patent
Yu et al.

(10) Patent No.: US 9,532,272 B2
(45) Date of Patent: Dec. 27, 2016

(54) METHODS FOR MANAGING RADIO RESOURCES BETWEEN MULTIPLE RADIO MODULES AND COMMUNICATIONS APPARATUS UTILIZING THE SAME

(71) Applicant: MediaTek Inc., Hsin-Chu (TW)

(72) Inventors: Ching-Hwa Yu, Tainan (TW); Shao-Wei Chen, New Taipei (TW); Chia-Shun Wan, Hsinchu (TW); Tsai-Yuan Hsu, Jhubei (TW); Chia-Hsiang Hsu, Kaohsiung (TW); Shih-Chang Su, Hukou Township, Hsinchu County (TW); Chih-Shi Yee, Baoshan Township, Hsinchu County (TW); Chieh-Chao Liu, Hsinchu (TW); Hsiao-Min Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/411,721

(22) PCT Filed: Apr. 2, 2013

(86) PCT No.: PCT/CN2013/073622
§ 371 (c)(1),
(2) Date: Dec. 29, 2014

(87) PCT Pub. No.: WO2014/005441
PCT Pub. Date: Jan. 9, 2014

(65) Prior Publication Data
US 2015/0181469 A1 Jun. 25, 2015

Related U.S. Application Data

(60) Provisional application No. 61/667,252, filed on Jul. 2, 2012.

(51) Int. Cl.
*H04B 7/00* (2006.01)
*H04W 28/18* (2009.01)
(Continued)

(52) U.S. Cl.
CPC ........... *H04W 28/18* (2013.01); *H04B 7/0689* (2013.01); *H04B 7/0691* (2013.01);
(Continued)

(58) Field of Classification Search
CPC ........ H04W 88/02; H04W 48/02; H04W 4/00; H04W 72/1215
(Continued)

(56) References Cited

U.S. PATENT DOCUMENTS 7,949,812 B1 * 5/2011 Wong .................... H04W 48/02
370/345
8,223,693 B2 * 7/2012 Ko ...................... H04W 52/281
370/328
(Continued)

FOREIGN PATENT DOCUMENTS

CN 101360265 2/2009
CN 101897197 11/2010
(Continued)

OTHER PUBLICATIONS

Pefkianakis, I., et al.; "What is wrong right with IEEE 802A in Spatial Multiplexing Power Save Feature;" 19th International Conference on Network Protocols; IEEE; 2011; pp. 186-195.
(Continued)

*Primary Examiner* — Khaled Kassim
*Assistant Examiner* — Berhanu Belete
(74) *Attorney, Agent, or Firm* — McClure, Qualey & Rodack, LLP

(57) ABSTRACT

Communications apparatus includes first and second radio modules and an antenna array coupled to the first and the
(Continued)

second radio modules and includes multiple antennas. When the first and the second radio modules operate at the same time, the first radio module negotiates with a first communications device an amount of antenna(s) to be used by a first message, so that the first radio module operates with the amount of the antenna(s) and second radio module operates with at least one of the remaining antenna(s).

20 Claims, 7 Drawing Sheets

(51) Int. Cl.
    *H04B 7/06*     (2006.01)
    *H04B 7/08*     (2006.01)
    *H04W 52/02*     (2009.01)
    *H04W 72/04*     (2009.01)

(52) U.S. Cl.
    CPC ......... *H04B 7/0693* (2013.01); *H04B 7/0697* (2013.01); *H04B 7/0871* (2013.01); *H04B 7/0874* (2013.01); *H04B 7/0877* (2013.01); *H04W 52/0229* (2013.01); *H04W 72/046* (2013.01); *Y02B 60/50* (2013.01)

(58) Field of Classification Search
    USPC ............ 455/443, 435.3, 448, 500, 501, 512, 63.1,455/67.13, 71, 553.1; 375/144, 148; 370/310–311
See application file for complete search history.

(56) References Cited

U.S. PATENT DOCUMENTS

| | | | |
|---|---|---|---|
| 8,472,427 B1* | 6/2013 | Wheeler | H04W 72/1215 370/348 |
| 8,630,268 B2 | 1/2014 | Tamaki | |
| 8,792,937 B2 | 7/2014 | Hassan et al. | |
| 8,848,676 B1* | 9/2014 | Wheeler | H04B 7/0802 370/311 |
| 8,908,667 B1* | 12/2014 | Wong | H04B 1/04 370/327 |
| 9,002,282 B1* | 4/2015 | de la Broise | H04B 1/40 375/144 |
| 9,066,369 B1* | 6/2015 | Nemavat | H04W 88/06 |
| 2002/0122411 A1* | 9/2002 | Zimmerman | H04L 12/24 370/349 |
| 2009/0063740 A1* | 3/2009 | Yeh | H04W 72/1215 710/113 |
| 2009/0081962 A1* | 3/2009 | Sohrabi | H04W 72/1242 455/79 |
| 2009/0116437 A1* | 5/2009 | Alexandre | H04W 48/18 370/329 |
| 2009/0156191 A1* | 6/2009 | Hassan | H01Q 1/2291 455/418 |
| 2009/0161596 A1* | 6/2009 | Wang | H04L 12/1863 370/312 |
| 2009/0196210 A1* | 8/2009 | Desai | H04W 52/0225 370/311 |
| 2009/0239574 A1* | 9/2009 | Hussain | H04W 52/0229 455/552.1 |
| 2010/0091747 A1* | 4/2010 | Dorsey | H04B 1/036 370/338 |
| 2010/0304685 A1 | 12/2010 | Wietfeldt et al. | |
| 2011/0105175 A1 | 5/2011 | Wang et al. | |
| 2011/0235755 A1 | 9/2011 | Yang et al. | |
| 2011/0250926 A1* | 10/2011 | Wietfeldt | H01Q 1/243 455/525 |
| 2011/0294456 A1* | 12/2011 | Anderson | H04W 28/18 455/404.1 |
| 2012/0046000 A1* | 2/2012 | Gao | H04W 72/02 455/73 |
| 2012/0134279 A1* | 5/2012 | Tamaki | H04B 7/024 370/248 |
| 2012/0270508 A1* | 10/2012 | Prasad | H04W 4/003 455/73 |

FOREIGN PATENT DOCUMENTS

| | | |
|---|---|---|
| CN | 102480316 | 5/2012 |
| WO | WO 2011/084715 | 7/2011 |

OTHER PUBLICATIONS

International Search Report for PCT/CN2013/073622 dated Jul. 11, 2013.
English language translation of abstract of CN 101360265 (published Feb. 4, 2009).
English language translation of abstract of CN 101897197 (published Nov. 24, 2010).
English language translation of abstract of CN 102480316 (published May 30, 2012).

* cited by examiner

METHODS FOR MANAGING RADIO RESOURCES BETWEEN MULTIPLE RADIO MODULES AND COMMUNICATIONS APPARATUS UTILIZING THE SAME

CROSS REFERENCE TO RELATED APPLICATIONS

This application is a National Stage Application of PCT/CN2013/073622, filed on Apr. 2, 2013, which claims the benefit of U.S. Provisional Application No. 61/667,252, filed Feb. 2, 2012, and entitled "MIMO TDD coexistence improvement", the entirety of which is incorporated by reference herein.

TECHNICAL FIELD

The invention relates to communications apparatuses and methods for managing the limited radio resources between multiple radio modules to achieve a desirable data transmission throughput performance.

BACKGROUND

The term "wireless" normally refers to an electrical or electronic operation that is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications).

Along with the advancements in wireless communications technology, radio modules providing different wireless communications services can now be co-located or coexist in a wireless communications device. However, for reducing the hardware cost, the radio resources, such as the antennas, equipped in the wireless communications device are generally shared between multiple radio modules. Therefore, how to manage the limited radio resource shared between multiple radio modules becomes an important issue.

Several time division duplex (TDD) solutions have been developed for dealing with the issue of sharing radio resources between multiple radio modules co-located in a wireless communications device. Based on the concept of the TDD solutions, the time granted for using the shared radio resources for one radio module is separated from that of the other radio module(s). However, one notable disadvantage of the TDD solutions is that the data transmission throughput will be downgraded since each radio module must sacrifice a portion of time of using the radio resources for the other radio module(s). The data transmission throughput downgrade becomes more serious when the amount of data transmission for a radio module is greatly increased. The amount of data transmission will be greatly increased in some scenarios, such as the multiple Base Station, or called multiple access point, application for which a radio module connects to multiple base stations or multiple access points, multiple profile application for which a radio module simultaneously provide multiple profiles, or the likes.

In this regard, novel communications apparatuses and methods for managing the limited radio resources between multiple radio modules to achieve a desirable data transmission throughput performance are highly desired.

SUMMARY

Communications apparatuses and methods for managing radio resources between multiple radio modules in a communications apparatus are provided. An exemplary embodiment of a communications apparatus comprises a first radio module, a second radio module and an antenna array. The first radio module communicates with a first communications device in compliance with a first protocol. The second radio module communicates with a second communications device in compliance with a second protocol. The antenna array is coupled to the first radio module and the second radio module and comprises a plurality of antennas. When the first radio module and the second radio module operate at the same time, the first radio module negotiates with the first communications device an amount of antenna(s) by a first message, so that the first radio module operates with the amount of antenna(s) and the second radio module operates with at least one of the remaining antenna(s).

An exemplary embodiment of a method for managing radio resources in a communications apparatus comprising at least a first radio module, a second radio module, and an antenna array comprising a plurality of antennas coupled to the first radio module and the second radio module, comprises: transmitting a first message from the first radio module to a first communications device to negotiate an amount of antenna(s) with a first communications device when the first radio module and the second radio module operate at the same time, wherein the first message is transmitted before the second radio module performing any transceiving activities; coupling the amount of the antenna(s) to the first radio module for operation; and coupling at least one of the remaining antenna(s) to the second radio module for operation.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
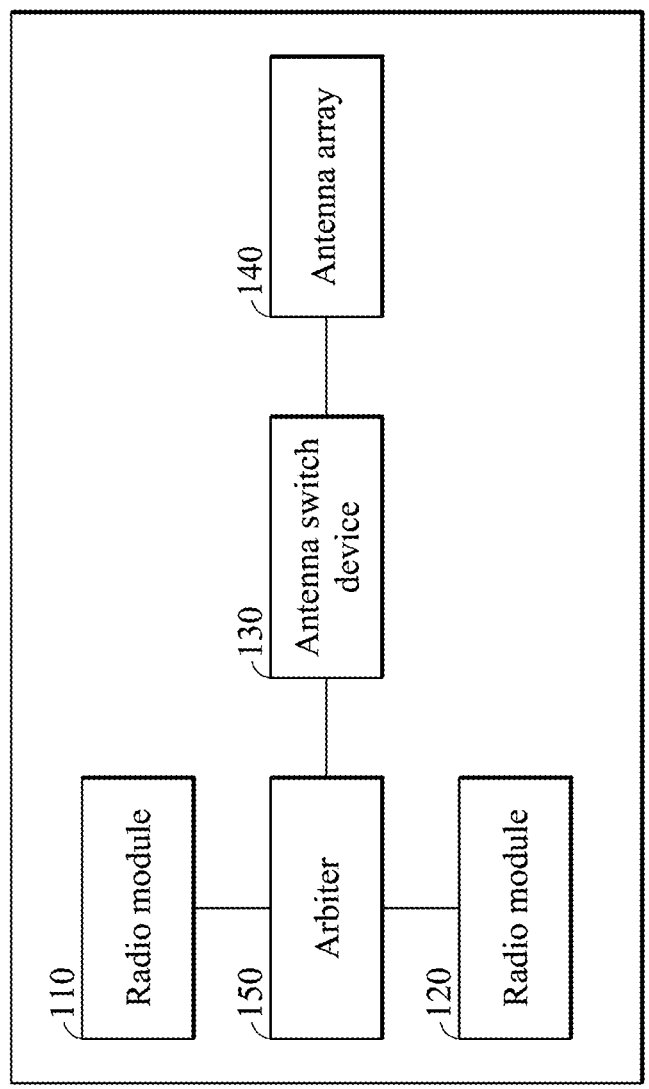
FIG. 1 shows a block diagram of a communications apparatus according to an embodiment of the invention.

FIG. 1 shows a block diagram of a communications apparatus according to an embodiment of the invention. The communications apparatus 100 may comprise multiple radio modules, such as the radio modules 110 and 120, an antenna switch device 130, an antenna array 140 and an arbiter 150. The radio module 110 may provide a first wireless communications service and communicate with a first communications device (not shown), which may be a peer communications device, in compliance with a first protocol. The radio module 120 may provide a second wireless communications service and communicate with a second communications device (not shown) which may be a peer communications device, in compliance with a second protocol. The antenna array 140 comprises a plurality of antennas coupled to and shared between the radio modules 110 and 120. The antenna switch device 130 is coupled to the antenna array 140 and the radio modules 110 and 120 for switching connections between the antennas and the radio modules 110 and 120 in response to one or more switch commands. The arbiter 150 is coupled to the antenna switch device 130 and the radio modules 110 and 120 for arbitrating a right to use each antenna and issues the switch commands to instruct the antenna switch device 130 to switch the connections. Here, the term "transceiving activity" may refer to any activity for transmitting radio frequency (RF) signals to an air interface, and/or receiving the RF signals from the air interface.

Figure 2:
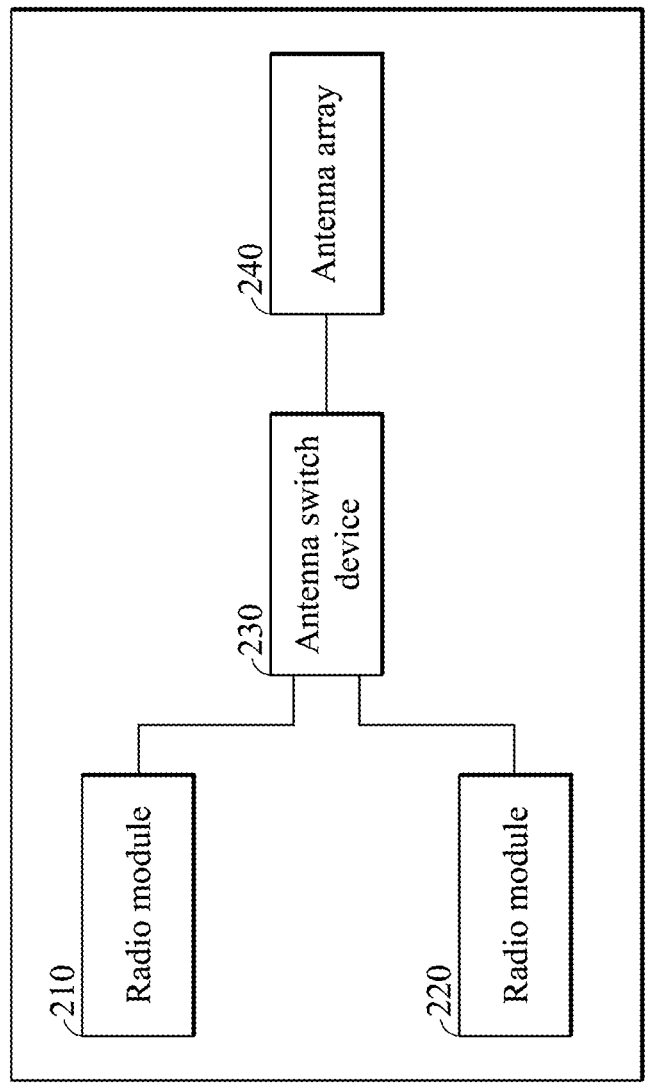
FIG. 2 shows a block diagram of a communications apparatus according to another embodiment of the invention.

According to an embodiment of the invention, the arbiter 150 may be implemented as a dedicated hardware device, or may be implemented by software instructions or program codes (when the software instructions or program codes are executed by a processor in the communications apparatus, it can be regarded as a hardware device having the corresponding functions). Note that the arbiter 150 may be configured outside of the radio modules 110 and 120, as shown in FIG. 1, or may be configured inside of either of the radio module 110 or 120. FIG. 2 shows a block diagram of a communications apparatus according to another embodiment of the invention. The communications apparatus 200 may comprise multiple radio modules, such as the radio modules 210 and 220, an antenna switch device 230 and an antenna array 240. In this embodiment, the arbiter may be implemented as a dedicated hardware device configured inside one of the radio modules 210 and 220, or may be implemented by software instructions or program codes stored in a memory device (not shown) of the one of the radio modules 210 and 220. Note that the communications apparatus 200 has a similar architecture to the communications apparatus 100 and like items are indicated by like reference numbers; descriptions of like items are not repeated.

Note further that to simplify the illustrations of the concept of the invention, there are only two radio modules shown in the embodiments of FIG. 1 and FIG. 2. However, it should be understood that the communications apparatus may certainly comprise more than two radio modules. Therefore, the invention should not be limited to the architectures as shown in FIG. 1 and FIG. 2.

In the embodiments of the invention, the communications apparatus 100 and 200 may be a notebook, a cellular phone, a portable gaming device, a portable multimedia player, a table computer, a Global Positioning System (GPS) receiver, a Personal Digital Assistant (PDA), or others. In addition, in the embodiments of the invention, the radio modules co-located in the communications apparatus 100 and 200 may be a WiMAX module, a Wi-Fi module, a Bluetooth module, a 2G/3G/4G or LTE module, a GSP module, or others, for providing the corresponding communications services in compliance with the corresponding protocol.

In the following paragraphs, in order to provide a clear way of illustrating the concept of the invention, two radio modules are designed to be co-located in the communications apparatus 100 and 200. One radio module may be a Wi-Fi module capable of providing wireless communications services and communicating with another peer Wi-Fi communications device (such as an access point, a station, or others) in compliance with the Wi-Fi or 802.11 series related protocols, and the other one may be a Bluetooth module capable of providing wireless communications services and communicating with another peer Bluetooth communications device (such as a cellular phone, a Bluetooth earphone, or others) in compliance with the Bluetooth or 802.15 series related protocols. Note that those who are skilled in this technology can still make various alterations and modifications without departing from the scope and spirit of this invention. Therefore, the scope of the present invention shall be defined and protected by the following claims and their equivalents.

Based on the concept of the invention, when both (or more than one) radio modules operate at the same time and/or have one or more transceiving activities to be performed during the same time period, one radio module (hereinafter called the first radio module) may transmit a message to a peer communications device that is communicating with the first radio module to negotiate with the peer communications device an amount of antenna(s) or trigger a procedure for changing an amount of antenna(s) to be used, so that the first radio module operates with the amount of antenna(s) (that is, uses a portion of the antennas) to perform the one or more transceiving activities thereof. In this manner, the remaining antenna(s), which is/are not used by the first radio module, can be reserved for the other radio module (hereinafter called the second radio module) to perform the one or more transceiving activities thereof.

Figure 3:
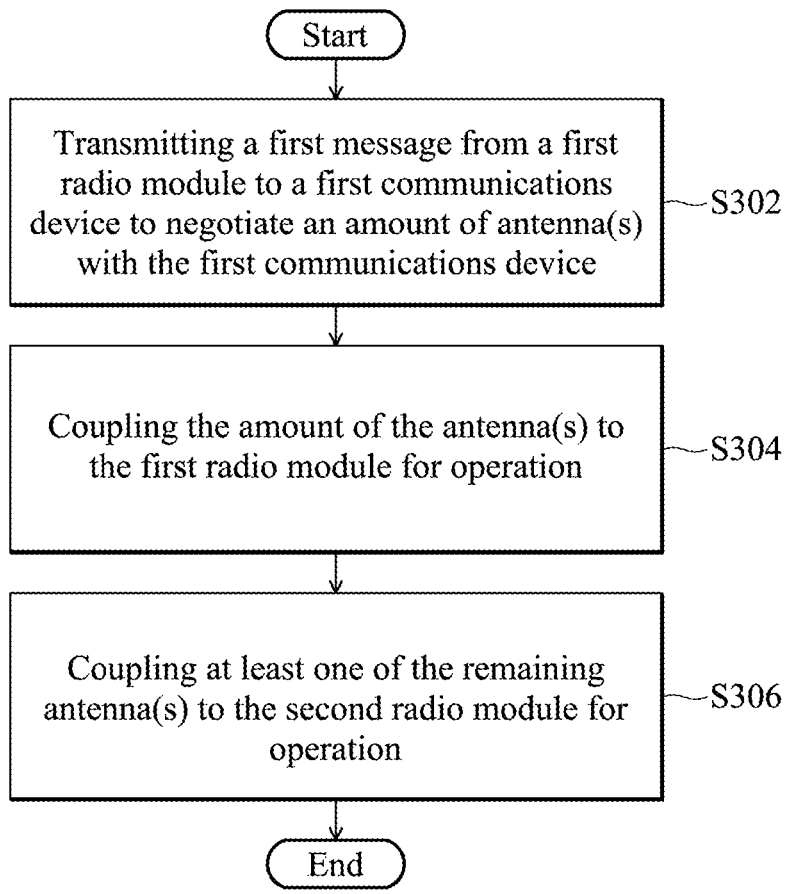
FIG. 3 shows a flow chart of a method for managing radio resources between multiple radio modules in a communications apparatus according to an embodiment of the invention.

FIG. 3 shows a flow chart of a method for managing radio resources between multiple radio modules in a communications apparatus according to an embodiment of the invention. When it is determined that both (or more than one) radio modules operate at the same time, a message may be transmitted from a first radio module to a first communications device to negotiate an amount of antenna(s) to be used (Step S302). Next, in response to the message, the amount of the antenna(s) may be coupled to the first radio module for operation (Step S304) and at least one of the remaining antenna(s) may be coupled to a second radio module for operation (Step S306). In order to further illustrate the concept of the invention, several preferable embodiments are given in the following paragraphs.

According to a first embodiment of the invention, a spatial multiplexing power save mechanism may be triggered in response to transmission of the message, so that the amount of antenna(s) to be used by the first radio module can be decreased. To be more specific, the first radio module may transmit the message to the peer communications device for notifying that the spatial multiplexing power save mechanism is enabled and one or more antennas is/are now in the power save state or disabled. In this manner, the first radio module may concede the second radio module the right to the one or more antenna(s). The SMPS (Spatial multiplexing power save) is a mechanism to conserve power of the communications apparatus. Note that in order to simplify the illustrations of the concept of the invention in the following paragraphs, the first radio module is a Wi-Fi module, the second radio module is a Bluetooth module and there are two antennas comprised in the communications apparatus. However, it should be understood that those who are skilled in this technology can still make various alterations and modifications without departing from the scope and spirit of this invention by using different radio modules or a different amount of antennas. Therefore, the invention should not be limited thereto.

Figure 4:
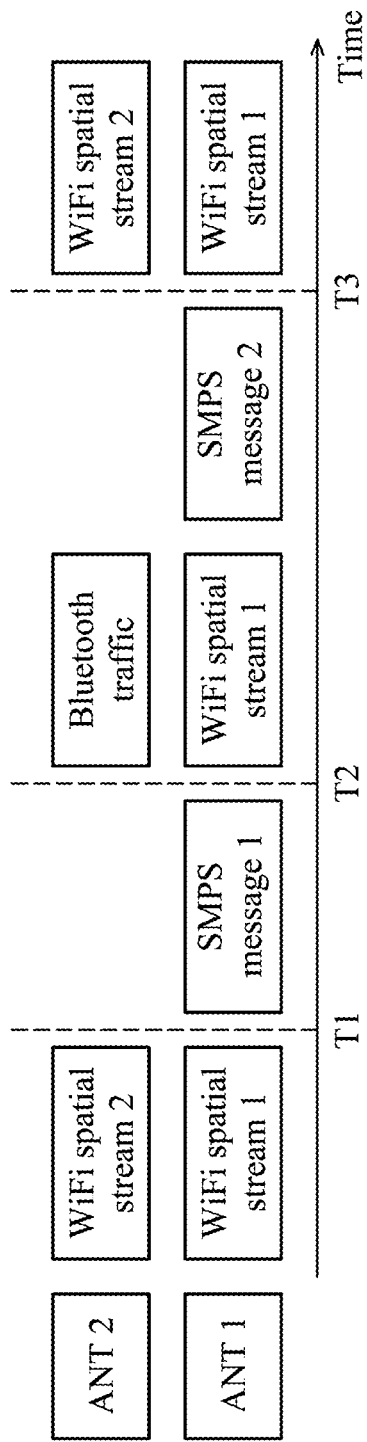
FIG. 4 is a diagram showing the transceiving activities performed by the antennas comprised in the communications apparatus along the time axis according to a first embodiment of the invention.

FIG. 4 is a diagram showing the transceiving activities performed by the antennas comprised in the communications apparatus 100 or 200 along the time axis according to the first embodiment of the invention. Suppose that there is no Bluetooth traffic needed to be transmitted or received before time T1, the Wi-Fi module may use both of the antennas ANT 1 and ANT 2 to transmit or receive the Wi-Fi spatial stream 1 and Wi-Fi spatial stream 2 before time T1 to increase the data transmission throughput or signal quality.

When it is determined that the Bluetooth module has some incoming traffic to be transmitted or received after time T1, the Wi-Fi module may transmit a first message (labeled by SMPS message 1) to enable a spatial multiplexing power save (SMPS) mechanism. Note that the determination of incoming Bluetooth traffic may be made according to a preset timer or according to the interrupt or instruction signal transmitted by the Bluetooth module. To be more specific, for example, the Bluetooth traffic schedule may be previously stored in an internal memory of the arbiter so that the arbiter may be aware of the incoming Bluetooth traffic, as a corresponding timer has expired, without being notified by the Bluetooth module. For another example, the Bluetooth module may also transmit the interrupt or instruction signal to the arbiter to notify the arbiter of the incoming traffic and request for the right to use the antenna(s).

According to the embodiment of the invention, an SMPS message may carry information regarding whether the SMPS is enabled and which mode is selected. When the SMPS is enabled, it means that the communications apparatus (e.g. the communications apparatus 100/200) transmitting the SMPS message is now supporting the SMPS protocol. The mode to be selected by the communications apparatus may comprise a SISO (Single-Input Single-Output) mode, a MIMO mode and a dynamic mode. In the embodiment, the SMPS message 1 transmitted by the Wi-Fi module may carry information regarding that the SMPS is enabled and the SISO mode is selected. Since the SISO mode is selected, the Wi-Fi module may only use a single antenna (for example, ANT 1 in the embodiment) in the subsequent transceiving activities after time T2 followed by the transmission of the SMPS message 1 as shown in FIG. 4.

Upon the enablement of the SMPS mechanism, the antenna ANT 1 may remain coupled to the Wi-Fi module for transmitting or receiving the Wi-Fi spatial stream 1, and the antenna ANT 2 may be changed so as to be coupled to the Bluetooth module for transmitting or receiving Bluetooth traffic.

According to the embodiment of the invention, after the Bluetooth module has finished operations for transceiving the Bluetooth traffic, the Wi-Fi module may further transmit a second message (labeled by SMPS message 2) to the peer communications device to notify the peer communications device that the SMPS mechanism is disabled or that the SMPS mechanism is still enabled but the amount of antenna (s) to be used in one or more subsequent transceiving activities is increased. For example, the SMPS message 2 transmitted by the Wi-Fi module may carry information regarding the SMPS being disabled or the SMPS being enabled and that the MIMO or dynamic mode is selected. Therefore, after time T3, the antenna ANT 1 may remain coupled to the Wi-Fi module for transmitting or receiving the Wi-Fi spatial stream 1, and the antenna ANT 2 may be changed to be coupled to the Wi-Fi module for transmitting or receiving the Wi-Fi spatial stream 2. The amount of antennas to be used by the Wi-Fi module can thus be increased.

In some embodiments of the invention, the SMPS message 1 and SMPS message 2 may be periodically or non-periodically transmitted for several times, for repeatedly switching the right to use the antenna ANT 2 during the interval when the Bluetooth module is turned on, powered on or awake. Note that in some other embodiments of the invention, the Wi-Fi module may also transmit the SMPS message 1 for only one time during the interval when the Bluetooth module is turned on, powered on or awake, and transmit the SMPS message 2 after the Bluetooth module is turned off, powered down, disconnected or has entered sleep mode.

In the first embodiment of the invention, suppose that the Wi-Fi module is capable of supporting multiple-input multiple-output (MIMO) communications, transition of the behavior of the Wi-Fi module may be that MIMO (N×N)->SISO->MIMO (N×N), where N is the amount of the antennas comprised in the communications apparatus 100 or 200.

By enabling the SMPS mechanism in the first embodiment of the invention, both the Bluetooth traffic and the Wi-Fi spatial stream can be transmitted simultaneously or received during the same time period (for example, from time T2 to time T3). Therefore, the data transmission throughput can be greatly improved and the risk of rate drop or being disconnected from the peer communications device can be reduced as compared with the conventional TDD solutions.

According to a second embodiment of the invention, one or more antenna selection indices may be changed via the message transmitted by the first radio module, so that the amount of antenna(s) to be used by the first radio module can be decreased. To be more specific, the first radio module may transmit the message to the peer communications device for changing the antenna selection indices and notifying the peer communications device that one or more antennas is/are disabled. In this manner, the first radio module may concede the second radio module the right to use the one or more antenna(s). Note that in order to simplify the illustrations of the concept of the invention in the following paragraphs, the first radio module is a Wi-Fi module, the second radio module is a Bluetooth module and there is N antennas comprised in the communications apparatus. However, it should be understood that those who are skilled in this technology can still make various alterations and modifications without departing from the scope and spirit of this invention by using different radio module or different amount of antennas. Therefore, the invention should not be limited thereto.

Figure 5:
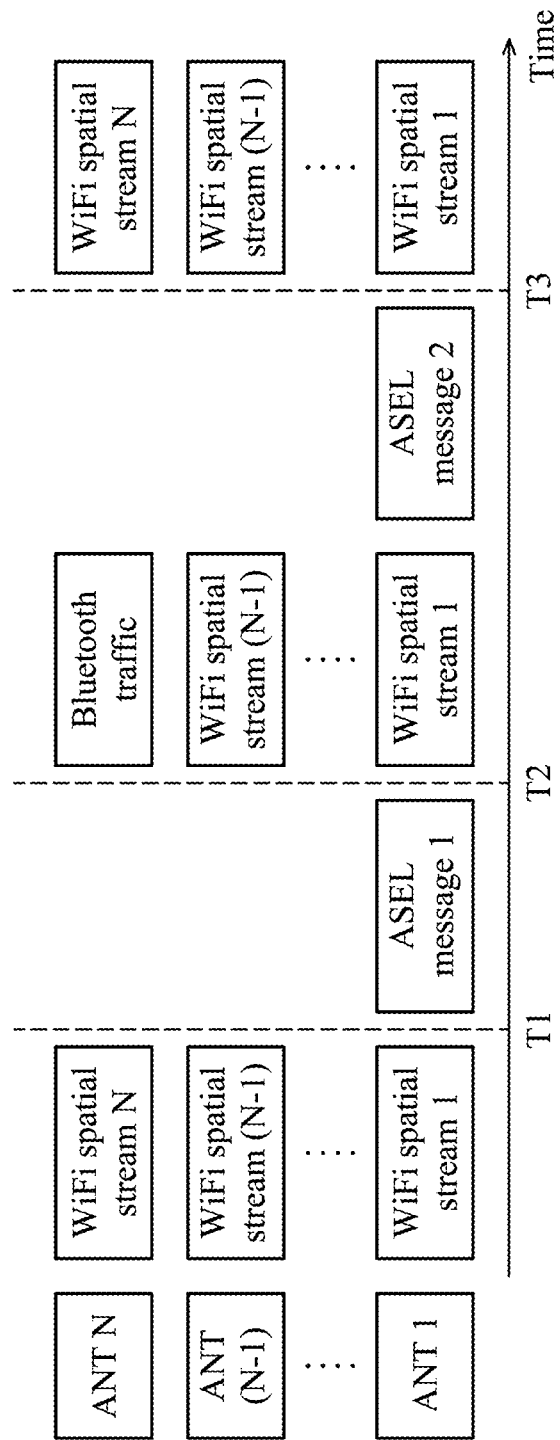
FIG. 5 is a diagram showing the transceiving activities performed by the antennas comprised in the communications apparatus along the time axis according to a second embodiment of the invention.

FIG. 5 is a diagram showing the transceiving activities performed by the antennas comprised in the communications apparatus 100 or 200 along the time axis according to the second embodiment of the invention. Suppose that there is no Bluetooth traffic needed to be transmitted or received before time T1, the Wi-Fi module may use all of the antennas ANT 1~ANT N to transmit or receive the Wi-Fi spatial stream 1~Wi-Fi spatial stream N before time T1 to increase the data transmission throughput or signal quality.

When it is determined that the Bluetooth module has some incoming traffic to be transmitted or received after time T1, the Wi-Fi module may transmit a first message (labeled by ASEL message 1) to change the antenna selection indices set before. Note that, as previously described, the determination of incoming Bluetooth traffic may be made according to a preset timer or according the interrupt or instruction signal transmitted by the Bluetooth module.

According to an embodiment the invention, the ASEL message 1 may be an Antenna Selection Indices Feedback message (or an Antenna Selection Indices Feedback frame) carrying the antenna indices feedback. The antenna indices may be regarded as an antenna configuration, which may be defined as a bitmap of allowed antennas to use for either receiving or transmitting. Separate bitmaps may be used for RX and TX to allow configuring different antennas for receiving and transmitting. The bitmap may be 8 bit long, each bit representing one antenna. For example, when four bits in the bitmap is set to 1 by the communications apparatus (e.g. the communications apparatus 100 or 200), it means that there are four antennas configured in the communications apparatus. For a peer communications device receiving the Antenna Selection Indices Feedback message may be provided with information about the antenna configuration of the communications apparatus.

According to an embodiment of the invention, the ASEL message 1 transmitted by the Wi-Fi module may carry information regarding that the bitmap with one or more bits, which was previously set to 1, is/are currently set to 0. The number of the bits with values being changed from 1 to 0 may depend on the amount of antennas requested by the Bluetooth module. For simplicity, in the embodiment as shown in FIG. 5, the number of the bits with value being changed from 1 to 0 is one. Since one bit in the bitmap is set to 0, the Wi-Fi module may only use (N−1) antennas after time T2 followed by the transmission of the ASEL message 1 as shown in FIG. 5. Therefore, the antennas ANT 1~ANT (N−1) may remain coupled to the Wi-Fi module for transmitting or receiving the Wi-Fi spatial streams 1~(N−1), and the remaining antenna ANT N may be changed so as to be coupled to Bluetooth module for transmitting or receiving the Bluetooth traffic.

According to the embodiment of the invention, after the Bluetooth module has finished operations for transceiving the Bluetooth traffic, the Wi-Fi module may further transmit a second message (labeled by ASEL message 2) to the peer communications device to change the antenna selection indices set in the ASEL message 1. For example, the ASEL message 2 transmitted by the Wi-Fi module may carry information about the bitmap with one bit, which was previously changed from 1 to 0, being currently set to 1. Therefore, after time T3, the antenna ANT N may be changed so as to be coupled to the Wi-Fi module for transmitting or receiving the Wi-Fi spatial stream N. The amount of antennas to be used by the Wi-Fi module can thus be increased.

In some embodiments of the invention, the ASEL message 1 and ASEL message 2 may be transmitted periodically or non-periodically several times, for repeatedly switching the right to use the antenna ANT N during the interval when the Bluetooth module is turned on, powered on or awake. Note that in some other embodiments of the invention, the Wi-Fi module may also transmit the ASEL message 1 for only one time during the interval when the Bluetooth module is turned on, powered on or awake, and transmit the ASEL message 2 after the Bluetooth module is turned off, powered down, disconnected or has entered sleep mode.

In the second embodiment of the invention, suppose that the Wi-Fi module is capable of supporting multiple-input multiple-output (MIMO) communications, transition of the behavior of the Wi-Fi module may be that MIMO (N×N)->MIMO [(N−k)×(N−k)]->MIMO (N×N), where N is the amount of the antennas comprised in the communications apparatus 100 or 200 and k is the amount of antennas being switched to be connected to the Bluetooth module.

By enabling the changing the antenna selection indices in the second embodiment of the invention, both the Bluetooth traffic and the Wi-Fi spatial stream can be transmitted or received simultaneously during the same time period (for example, from time T2 to time T3). Therefore, the data transmission throughput can be greatly improved and the risk of rate drop or being disconnected from the peer communications device can be reduced as compared with the conventional TDD solutions. In addition, since the behavior of the Wi-Fi module may be changed from MIMO (N×N) to MIMO [(N−k)×(N−k)], the data transmission throughput of the Wi-Fi module may be further improved as compared with the first embodiment.

According to a third embodiment of the invention, an amount of currently supported spatial stream(s) may be changed via the message transmitted by the first radio module, so that the amount of antenna(s) to be used by the first radio module can be decreased. To be more specific, the first radio module may transmit the message to the peer communications device to notify the peer communications device that the amount of spatial streams in the receiving path has been changed. In this manner, the first radio module may concede the second radio module the right to use one or more antenna(s). Note that in order to simplify the illustrations of the concept of the invention in the following paragraphs, the first radio module is a Wi-Fi module, the second radio module is a Bluetooth module and there are N antennas comprised in the communications apparatus. However, it should be understood that those who are skilled in this technology can still make various alterations and modifications without departing from the scope and spirit of this invention by using a different radio module or a different amount of antennas. Therefore, the invention should not be limited thereto.

Figure 6:
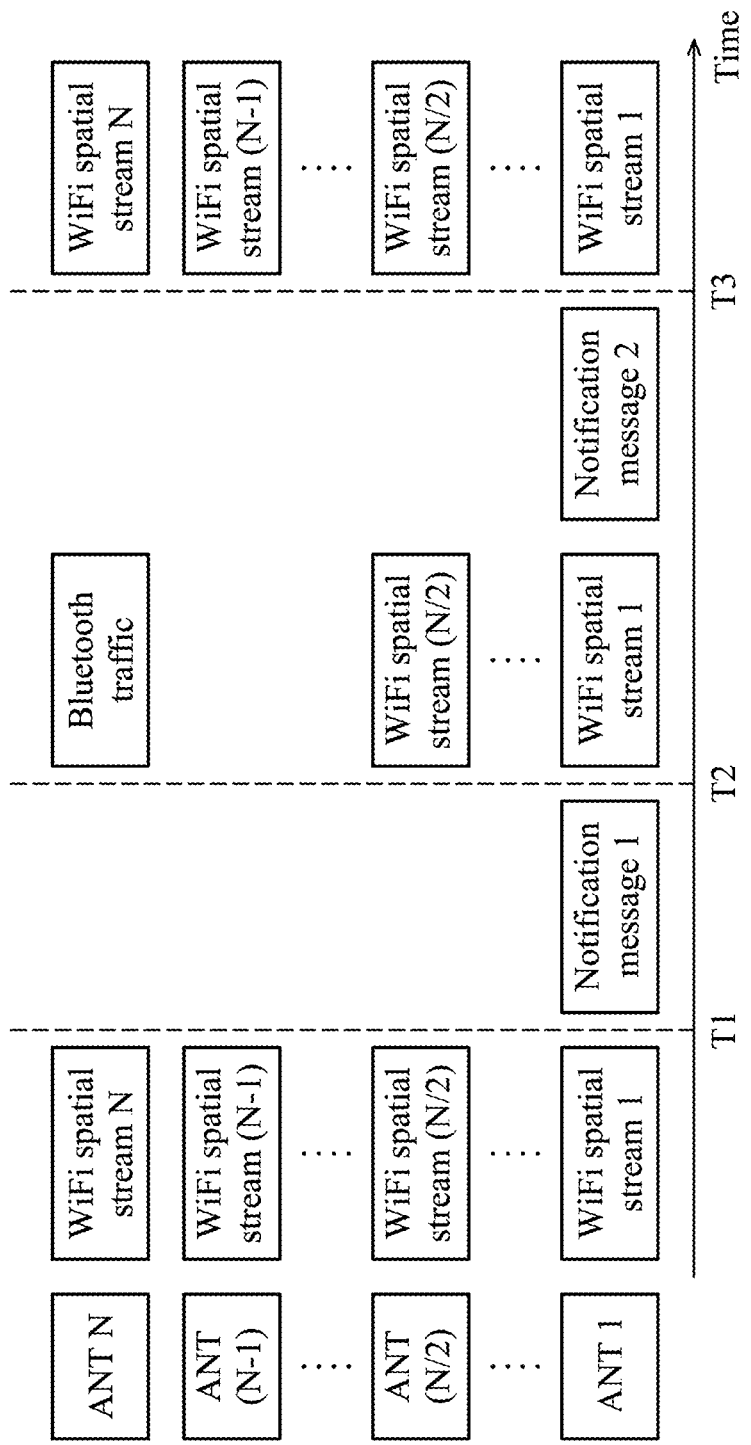
FIG. 6 is a diagram showing the transceiving activities performed by the antennas comprised in the communications apparatus along the time axis according to a third embodiment of the invention.

FIG. 6 is a diagram showing the transceiving activities performed by the antennas comprised in the communications apparatus 100 or 200 along the time axis according to the third embodiment of the invention. Suppose that there is no Bluetooth traffic needed to be transmitted or received before time T1, the Wi-Fi module may use all of the antennas ANT 1~ANT N to transmit or receive the Wi-Fi spatial stream 1~Wi-Fi spatial stream N before time T1 to increase the data transmission throughput or signal quality.

When it is determined that the Bluetooth module has some incoming traffic to be transmitted or received after time T1, the Wi-Fi module may transmit a first message (labeled by Notification message 1) to change the amount of currently supported spatial stream(s). Note that, as previously described, the determination of incoming Bluetooth traffic may be made according to a preset timer or according the interrupt or instruction signal transmitted by the Bluetooth module.

According to an embodiment the invention, the Notification message 1 may be an operation mode notification message (or an operation mode notification frame) or a beamforming notification message (or a beamforming notification frame) transmitted for notifying the peer communications device receiving the Notification message that the transmitting communications apparatus is changing its operating mode or channel width, the maximum number of spatial streams it can receive, or both. The Notification message 1 may carry two values, including a first value of a number of currently supported spatial stream(s) and a second value of a maximum number of supported spatial stream(s).

According to an embodiment of the invention, the Notification message 1 transmitted by the Wi-Fi module may carry information about that the number of currently supported spatial stream(s) having been decreased, for example, changed from 4 to 3 when a maximum number of supported spatial stream(s) is 4. Since currently supported spatial stream(s) has been decreased, the Wi-Fi module may only use a decreased amount of antennas (as an example, N/2 antennas when N is an even number) after time T2 followed by the transmission of the Notification message 1 as shown in FIG. 6. Therefore, the antennas ANT 1~ANT N/2 may remain coupled to the Wi-Fi module for transmitting or receiving the Wi-Fi spatial streams 1~N/2, and the remaining antenna ANT N may be changed so as to be coupled to Bluetooth module for transmitting or receiving the Bluetooth traffic. Note that the reason why the amount of antennas can be used after transmitting the Notification message 1 is about halved is that the Beamforming mechanism is triggered in response to the Notification message 1.

According to the embodiment of the invention, after the Bluetooth module has finished operations for transceiving the Bluetooth traffic, the Wi-Fi module may further transmit a second message (labeled by Notification message 2) to the peer communications device to change the amount of currently supported spatial stream(s). For example, the value of currently supported spatial stream(s) carried in the Notification message 2 may be set to 4. Therefore, after time T3, the antenna ANT N may be changed so as to be coupled to the Wi-Fi module for transmitting or receiving the Wi-Fi spatial stream N. The amount of antennas to be used by the Wi-Fi module can thus be increased.

In some embodiments of the invention, the Notification message 1 and Notification message 2 may be transmitted periodically or non-periodically for several times, for repeatedly switching the right to use the antenna ANT N during the interval when the Bluetooth module is turned on, powered on or awake. Note that in some other embodiments of the invention, the Wi-Fi module may also transmit the Notification message 1 for only one time during the interval when the Bluetooth module is turned on, powered on or awake, and transmit the Notification message 2 after the Bluetooth module is turned off, powered down, disconnected or has entered sleep mode.

In the third embodiment of the invention, suppose that the Wi-Fi module is capable of supporting multiple-input multiple-output (MIMO) communications, transition of the behavior of the Wi-Fi module in the receiving path may be that MIMO (N×N)->MIMO [N/2×N/2]->MIMO (N×N) and transition of the behavior of the Wi-Fi module in the transmitting path may be that MIMO (N×N)->MIMO [(N−1)×(N−1)]->MIMO (N×N), where N is the amount of the antennas comprised in the communications apparatus 100 or 200. Note that because in the embodiment as illustrated above, the Beamforming mechanism is only applied in the receiving path, only the number of spatial streams utilized in the receiving path is halved.

By changing the amount of currently supported spatial streams in the receiving path in the third embodiment of the invention, both the Bluetooth traffic and the Wi-Fi spatial stream can be simultaneously transmitted or received during the same time period (for example, from time T2 to time T3). Therefore, the data transmission throughput can be greatly improved and the risk of rate drop or being disconnected from the peer communications device can be reduced as compared with the conventional TDD solutions. In addition, since some antennas are disabled from time T2 to time T3, the consumed power can be saved as compared with the first and second embodiments.

According to a fourth embodiment of the invention, the first radio module may re-associate with the peer communications device, which the first radio module is now associated with, so that the amount of antenna(s) to be used by the first radio module can be decreased. To be more specific, the first radio module may transmit the message (such as a re-association request or a re-association frame) to the peer communications device to re-associate with the first communications device and change a setting of a multi-stream capability from MIMO to SISO. In this manner, the first radio module may concede the second radio module the right to use one or more antenna(s). Note that in order to simplify the illustrations of the concept of the invention in the following paragraphs, the first radio module is a Wi-Fi module, the second radio module is a Bluetooth module and there is N antennas comprised in the communications apparatus. However, it should be understood that those who are skilled in this technology can still make various alterations and modifications without departing from the scope and spirit of this invention by using different radio module or different amount of antennas. Therefore, the invention should not be limited thereto.

Figure 7:
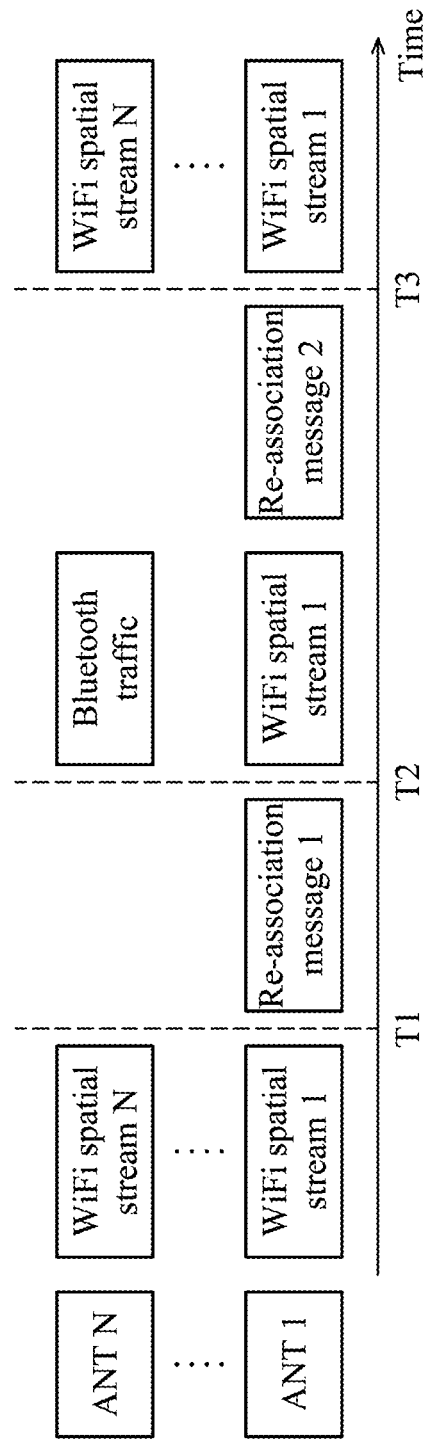
FIG. 7 is a diagram showing the transceiving activities performed by the antennas comprised in the communications apparatus along the time axis according to a fourth embodiment of the invention.

FIG. 7 is a diagram showing the transceiving activities performed by the antennas comprised in the communications apparatus 100 or 200 along the time axis according to the fourth embodiment of the invention. Suppose that there is no Bluetooth traffic needed to be transmitted or received before time T1, the Wi-Fi module may use all of the antennas ANT 1~ANT N to transmit or receive the Wi-Fi spatial stream 1~Wi-Fi spatial stream N before time T1 to increase the data transmission throughput or signal quality.

When it is determined that the Bluetooth module has some incoming traffic to be transmitted or received after time T1, the Wi-Fi module may transmit a first message (labeled by Re-association message 1) to re-associate with the peer communications device that is currently communicating with the Wi-Fi module. Note that, as previously described, the determination of incoming Bluetooth traffic may be made according to a preset timer or according the interrupt or instruction signal transmitted by the Bluetooth module.

According to an embodiment of the invention, the Re-association message 1 transmitted by the Wi-Fi module may carry information about the multi-stream capability being set to SISO. Since the multi-stream capability is now set to SISO, the Wi-Fi module may only use a single antennas after time T2 followed by the transmission of the Re-association message 1 as shown in FIG. 5. Therefore, the antennas ANT 1 may remain coupled to the Wi-Fi module for transmitting or receiving the Wi-Fi spatial streams 1, and the remaining antennas ANT 2~ANT N, depending the amount of antennas requested by the Bluetooth module, may be changed so as to be coupled to Bluetooth module for transmitting or receiving the Bluetooth traffic.

According to the embodiment of the invention, after the Bluetooth module has finished operations for transceiving the Bluetooth traffic, the Wi-Fi module may further transmit a second message (labeled by Re-association message 2) to the peer communications device to re-associate again with the peer communications device. For example, the Re-association message 2 transmitted by the Wi-Fi module may carry information about the multi-stream capability being set to MIMO. Therefore, after time T3, the antennas ANT 2~ANT N may be changed to be coupled to the Wi-Fi module for transmitting or receiving the Wi-Fi spatial stream 2~Wi-Fi spatial stream N. The amount of antennas to be used by the Wi-Fi module can thus be increased.

In some embodiments of the invention, the Re-association message 1 and Re-association message 2 may be transmitted periodically or non-periodically for several times, for repeatedly switching the right to use the antennas ANT 2~ANT N during the interval when the Bluetooth module is turned on, powered on or awake. Note that in some other embodiments of the invention, the Wi-Fi module may also transmit the Re-association message 1 for only one time during the interval when the Bluetooth module is turned on, powered on or awake, and transmit the Re-association message 2 after the Bluetooth module is turned off, powered down, disconnected or has entered sleep mode.

In the fourth embodiment of the invention, suppose that the Wi-Fi module is capable of supporting multiple-input multiple-output (MIMO) communications, transition of the behavior of the Wi-Fi module may be that MIMO (N×N)->SISO->MIMO (N×N), where N is the amount of the antennas comprised in the communications apparatus 100 or 200.

By re-associating with the peer communications device in the fourth embodiment of the invention, both the Bluetooth traffic and the Wi-Fi spatial stream can be simultaneously transmitted or received during the same time period (for example, from time T2 to time T3). Therefore, the data transmission throughput can be greatly improved and the risk of rate drop or being disconnected from the peer communications device can be reduced as compared with the conventional TDD solutions. In addition, since the Bluetooth module may not use all the remaining antennas ANT 2~ANT N, the consumed power can be saved as compared with the first and second embodiments.

According to a fifth embodiment of the invention, the first radio module may request the peer communications device to adjust its Spatial Time Block Coding (STBC) capacity, so that the amount of antenna(s) to be used by the first radio module can be decreased. To be more specific, the first radio module may transmit a corresponding message to the peer communications device to request the peer communications device to adjust its STBC capacity, for example, adjusted from MIMO to STBC. When the STBC is applied by the peer communications device, the amount of antenna(s) to be used by the first radio module can be decreased, leaving one or more unused antennas, so that the first radio module may concede the second radio module the right to use one or more remaining antenna(s).

By requesting the peer communications to applying the STBC scheme to communicate with the first radio module in the fifth embodiment of the invention, both the first radio module and the second radio module can performing their transceiving activities during the same time period simultaneously. Therefore, the data transmission throughput can be greatly improved and the risk of rate drop or being disconnected from the peer communications device can be reduced as compared with the conventional TDD solutions.

According to a sixth embodiment of the invention, the first radio module may request the peer communications device to adjust its antenna diversity capacity, so that the amount of antenna(s) to be used by the first radio module can be decreased. To be more specific, the first radio module may transmit a corresponding message to the peer communications device to request the peer communications device to enable the antenna diversity scheme for transmitting or receiving signals. When the antenna diversity scheme is used, the amount of antenna(s) to be used by the first radio module can be decreased, leaving one or more unused antennas, so that the first radio module may concede the second radio module the right to use one or more remaining antenna(s).

By requesting the peer communications to applying the antenna diversity scheme to communicate with the first radio module in the sixth embodiment of the invention, both the first radio module and the second radio module can performing their transceiving activities during the same time period simultaneously. Therefore, the data transmission throughput can be greatly improved and the risk of rate drop or being disconnected from the peer communications device can be reduced as compared with the conventional TDD solutions.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

The invention claimed is:
1. A communications apparatus, comprising:
a first radio module, communicating with a first communications device in compliance with a first protocol, wherein the first communications device is a peer communications device;
a second radio module, communicating with a second communications device in compliance with a second protocol, wherein the second communications device is a peer communications device; and
an antenna array, coupled to the first radio module and the second radio module and comprising a plurality of antennas,
wherein when the first radio module and the second radio module operate at the same time, the first radio module transmits a first message to the first communications device to trigger a procedure for changing an amount of antenna(s) used by the first radio module, so that the first radio module can use the amount of antenna(s) to communicate with the first communications device, and the remaining antenna(s) of the plurality of antennas, which is/are not used by the first radio module can be reserved for the second radio module to communicate with the second communications device, wherein the first radio module further transmits a second message to the first communications device to change the amount of currently supported spatial stream(s) after the second radio module has finished operating with the at least one of the remaining antenna(s), so that the amount of antenna(s) to be used by the first radio module after the transmission of the second message is increased.

2. The communications apparatus as claimed in claim 1, further comprising:

an antenna switch device, coupled to the antenna array, the first radio module and the second radio module for switching connections between the antennas and the first and second radio modules.

3. The communications apparatus as claimed in claim 2, further comprising:

an arbiter, coupled to the antenna switch device, the first radio module and the second radio module for arbitrating a right to use each antenna and issuing a switch command to instruct the antenna switch device to switch the connections.

4. The communications apparatus as claimed in claim 3, wherein the arbiter is configured inside of either the first radio module or the second radio module.

5. The communications apparatus as claimed in claim 1, wherein the first radio module transmits the first message to the first communications device to enable a spatial multiplexing power save mechanism, so that the amount of antenna(s) to be used is decreased.

6. The communications apparatus as claimed in claim 5, wherein after the second radio module has finished operating with the at least one of the remaining antenna(s), the first radio module further transmits a second message to the first communications device to disable the spatial multiplexing power save mechanism or increase the amount of antenna(s) to be used after the transmission of the second message.

7. The communications apparatus as claimed in claim 1, wherein the first radio module transmits the first message to the first communications device to change one or more antenna selection indices, so that the amount of antenna(s) to be used is decreased.

8. The communications apparatus as claimed in claim 7, wherein the first radio module further transmits a second message to the first communications device to change the antenna selection indices after the second radio module has finished operating with the at least one of the remaining antenna(s), so that the amount of antenna(s) to be used by the first radio module after the transmission of the second message is increased.

9. The communications apparatus as claimed in claim 1, wherein the first radio module transmits the first message to the first communications device to change an amount of currently supported spatial stream(s), so that the amount of antenna(s) to be used is decreased.

10. The communications apparatus as claimed in claim 1, wherein the first radio module transmits the first message to the first communications device to re-associate with the first communications device and change a setting of a multi-stream capability, so that the amount of antenna(s) to be used is decreased.

11. The communications apparatus as claimed in claim 10, wherein the first radio module further transmits a second message to the first communications device to re-associate again with the first communications device and change the setting of the multi-stream capability after the second radio module has finished operating with the at least one of the remaining antenna(s), so that the amount of antenna(s) to be used by the first radio module after the transmission of the second message is increased.

12. A method for managing radio resources in a communications apparatus comprising a first radio module, a second radio module, and an antenna array, wherein the antenna array comprises a plurality of antennas coupled to the first radio module and the second radio module, the method comprising:

transmitting a first message from the first radio module to a first communications device to trigger a procedure for changing an amount of antenna(s) used by the first radio module when the first radio module and the second radio module operate at the same time, wherein the first communications device is a peer communications device which communicates with the first module in compliance with a first protocol, and wherein the first message is transmitted before the second radio module performing any transceiving activities;

coupling the amount of the antenna(s) to the first radio module for operation, so that the first radio module can use the amount of antenna(s) to communicate with the first communications device; and coupling at least one of the remaining antenna(s) to the second radio module for operation, so that the remaining antenna(s), which is/are not used by the first radio module can be reserved for the second radio module to communicate with the second communications device, wherein the second communications device is a peer communications device which communicates with the second module in compliance with a second protocol, after the second radio module has finished operation, transmitting a second message from the first radio module to the first communications device to re-associate again with the first communications device and change the setting of the multi-stream capability.

13. The method as claimed in claim 12, wherein the first message is transmitted to the first communications device to enable a spatial multiplexing power save mechanism, so that the amount of antenna(s) to be used is decreased.

14. The method as claimed in claim 13, further comprising:

after the second radio module has finished operation, transmitting a second message from the first radio module to the first communications device to disable the spatial multiplexing power save mechanism or increase the amount of antenna(s) to be used after the transmission of the second message; and coupling one or more of the antenna(s), which was/were previously coupled to the second radio module, to the first radio module for operation.

15. The method as claimed in claim 12, wherein the first message is transmitted to the first communications device to change one or more antenna selection indices, so that the amount of antenna(s) to be used is decreased.

16. The method as claimed in claim 15, further comprising:

after the second radio module has finished operation, transmitting a second message from the first radio module to the first communications device to change the antenna selection indices; and coupling one or more of the antenna(s), which was/were previously coupled to the second radio module, to the first radio module for operation after the transmission of the second message, so that the amount of antenna(s) to be used by the first radio module is increased.

17. The method as claimed in claim 12, wherein the first message is transmitted to the first communications device to change an amount of currently supported spatial streams, so that the amount of antenna(s) is decreased.

18. The method as claimed in claim 17, further comprising:
   after the second radio module has finished operation, transmitting a second message from the first radio module to the first communications device to change the amount of currently supported spatial streams; and
   coupling one or more of the antenna(s), which was/were previously coupled to the second radio module, to the first radio module for operation after the transmission of the second message, so that the amount of antenna(s) to be used by the first radio module is increased.

19. The method as claimed in claim 12, wherein the first message is transmitted to the first communications device to re-associate with the first communications device and change a setting of a multi-stream capability, so that the amount of antenna(s) to be used is decreased.

20. The method as claimed in claim 19, further comprising:
   coupling one or more of the antenna(s), which was/were previously coupled to the second radio module, to the first radio module for operation after the transmission of the second message, so that the amount of antenna(s) to be used by the first radio module is increased.

* * * * *